J. W. WEYMOUTH.
Pruning-Shears.

No. 202,496.     Patented April 16, 1878.

Witnesses:
Arthur Stimson.
J. H. Lewis.

Inventor:
John W. Weymouth,
By Thomas G. Orwig,
Attorney.

UNITED STATES PATENT OFFICE.

JOHN W. WEYMOUTH, OF DES MOINES, IOWA, ASSIGNOR OF TWO-THIRDS HIS RIGHT TO D. R. EWING AND L. M. SANDFORD, OF SAME PLACE.

IMPROVEMENT IN PRUNING-SHEARS.

Specification forming part of Letters Patent No. 202,496, dated April 16, 1878; application filed September 6, 1877.

*To all whom it may concern:*

Be it known that I, JOHN W. WEYMOUTH, of Des Moines, in the county of Polk and State of Iowa, have invented an Improved Pruning-Tool, of which the following is a specification:

The object of my invention is to provide pruning-shears specially adapted for cutting off small twigs and branches, or limbs and trees that are two inches in diameter.

It consists in forming a series of concave cutting-edges in a blade that has a curved shank, and combining it with a straight blade that has a straight shank, in such a manner that the complete tool can be readily adjusted, applied, and operated to cut off large and small branches alternately, as required in pruning trees; all as hereinafter fully set forth.

Figure 1:
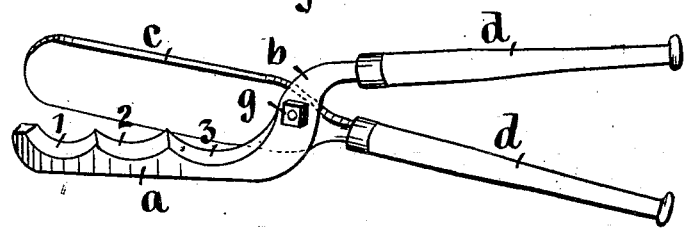

Figure 1 of my drawing is a perspective view of my complete invention, and illustrates its peculiar construction. $a$ is the blade or jaw, having a series of concaves, 1 2 3, in its cutting-edge and a curved shank, $b$. $c$ is a straight blade, that has a straight shank. $d$ $d$ are handles, of corresponding form and size, rigidly connected with the shanks of the jaws $a$ and $c$ by means of ferrules, or in any suitable way. $g$ represents a rivet or bolt, passed through the shanks of the blades $a$ and $c$ at the central point of their crossing, to pivot them together and to form a fulcrum upon which to rest and operate the lever-handles $d$.

The tool may vary in size, as desired.

Figure 2:
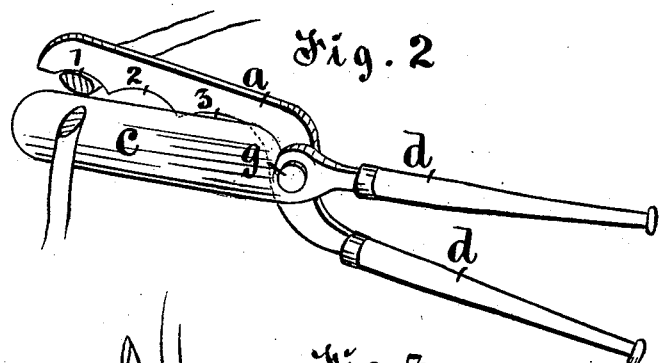

Fig. 2 is a perspective view, illustrating the application and operation of my improved shears in cutting off a small branch. The jaws or blades are opened only sufficiently to admit the branch into the No. 1 concave of the blade $a$. The lever-handles consequently need not be separated much, and the branch can be seized and sheared off instantly by short motions. The small branches to be pruned off are generally much more numerous than the large ones, and short, quick motions are an important desideratum; and the advantages of having a tool that can be adjusted to cut off small and large branches, as they are met in pruning a tree, are obvious.

Figure 3:
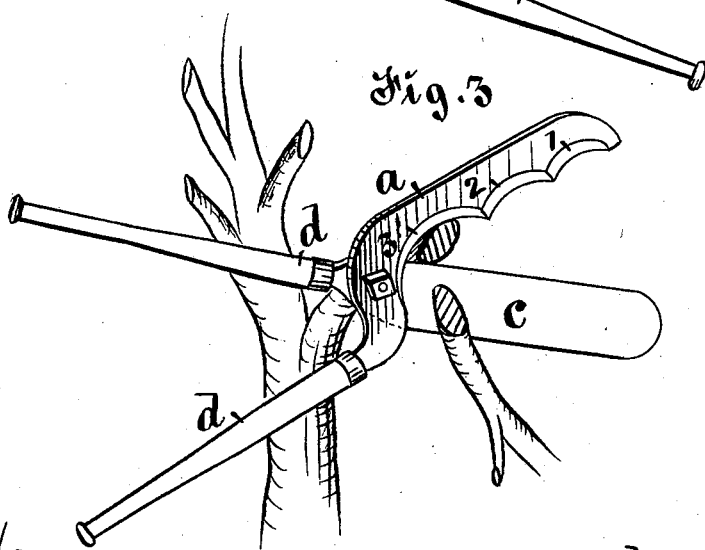

Fig. 3 is a perspective view, showing the tool adjusted and applied to cut off a large limb. The jaws or blades $a$ and $c$ are opened far enough to admit the limb, preferably in a diagonal position, into the largest and last concave of the jaw $a$ and close to the fulcrum. In this position the tool can be suspended, supported by the limb and the one hand of the operator at the lower end of the lowest lever-handle $d$. By reaching up and seizing the end of the elevated lever-handle $d$, the full force and weight of the operator can be readily and advantageously applied to close the jaws and sever the limb. If the limb should slip out of the concave No. 3, it would enter the next, and the limb could still be severed in the one motion of the closing of the jaws. By admitting the larger limbs into the acute angle of the open jaws and close to the fulcrum, the entire power of the instrument can be applied to sever the larger limbs with the same tool that is equally well adapted to snip off rapidly the smaller branches with rapid motions and less force.

I am aware that concaves have been formed in the blade of a pruning shears; but I claim that my manner of forming a graduated series of concaves in a blade that has a curved shank and straight lever-handle, and combining therewith a straight blade, having a straight shank and straight lever-handle, produces a shears of novel form, whereby large limbs are more readily admitted close to the pivotal fulcra, to be subjected to the full mechanical power of the tool. I also claim that each one of the graduated series of concaves in the blade having a curved shank is specially adapted to receive a branch of corresponding size, and to govern the motion of the operator in opening the shears and fixing the position of the branch in the tool relative to its center of motion and the force required to cut off the branch. The graduated concaves are therefore practically a scale, by means of which the operator can readily be governed in his motions to apply the graduated mechanical power of the tool to suit the varying sizes of the branches that are to be cut off, and to thereby save time and labor in pruning.

I claim as my invention—

As an improved article of manufacture, a pruning-shears composed of the curved blade $a$ $b$, having a series of graduated concaves, 1 2 3, adapted to receive branches of different sizes at different points from the center of motion, the straight blade $c$, the fixed fulcrum $g$, and the straight lever-handles $d$ $d$, substantially as shown and described, to be operated in the manner set forth.

JOHN W. WEYMOUTH.

Witnesses:
ARTHUR STIMSON,
L. M. SANDFORD.